United States Patent
Park et al.

(10) Patent No.: US 9,483,507 B2
(45) Date of Patent: Nov. 1, 2016

(54) METHOD FOR MANAGING DATA AND AN ELECTRONIC DEVICE THEREOF

(71) Applicant: Samsung Electronics Co. Ltd., Suwon-si, Gyeonggi-do (KR)

(72) Inventors: Hye-Jin Park, Seoul (KR); Jin-Hong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 13/930,398

(22) Filed: Jun. 28, 2013

(65) Prior Publication Data

US 2014/0032550 A1    Jan. 30, 2014

(30) Foreign Application Priority Data

Jul. 25, 2012   (KR) .................. 10-2012-0081079

(51) Int. Cl.
 *G06F 17/30* (2006.01)
 *G06Q 10/10* (2012.01)

(52) U.S. Cl.
 CPC ... *G06F 17/30312* (2013.01); *G06F 17/30265* (2013.01); *G06Q 10/10* (2013.01)

(58) Field of Classification Search
 CPC ........... G06F 17/218; G06F 17/30038; G06F 17/30268; G06F 17/30752; G06F 17/30312; G06F 17/30265
 USPC ........................................................ 707/736
 See application file for complete search history.

(56) References Cited

U.S. PATENT DOCUMENTS

| | | | |
|---|---|---|---|
| 6,209,005 B1 | 3/2001 | Harker et al. | |
| 8,285,760 B1* | 10/2012 | Sina | 707/824 |
| 8,634,947 B1* | 1/2014 | Kleinpeter et al. | 700/94 |
| 2009/0089254 A1 | 4/2009 | Von Kaenel et al. | |
| 2011/0078594 A1* | 3/2011 | Guertler et al. | 715/763 |
| 2011/0264495 A1* | 10/2011 | Hailey et al. | 705/14.16 |
| 2012/0114199 A1* | 5/2012 | Panyam et al. | 382/118 |
| 2012/0151398 A1* | 6/2012 | Foy et al. | 715/769 |
| 2012/0278330 A1* | 11/2012 | Campbell et al. | 707/740 |
| 2012/0323925 A1* | 12/2012 | Fitzsimmons et al. | 707/741 |
| 2013/0166550 A1* | 6/2013 | Buchmann et al. | 707/736 |
| 2014/0108963 A1* | 4/2014 | Black et al. | 715/753 |

FOREIGN PATENT DOCUMENTS

| | | |
|---|---|---|
| CN | 101706894 A | 5/2010 |
| CN | 102012945 A | 4/2011 |
| CN | 102129793 A | 7/2011 |
| EP | 1 197 879 A2 | 4/2002 |
| EP | 1 990 743 A1 | 11/2008 |
| EP | 2 432 209 A1 | 3/2012 |

* cited by examiner

*Primary Examiner* — Hosain Alam
*Assistant Examiner* — Saba Ahmed
(74) *Attorney, Agent, or Firm* — Jefferson IP Law, LLP (57) ABSTRACT

A data storage and retrieval method of an electronic device is provided. More particularly, an apparatus and a method for retrieving data through a contact application in the electronic device are provided. The method for retrieving data in the electronic device includes generating tagging data including added tag information when data is stored in the electronic device by executing a first application, storing the tagging data, updating a tagging data table which contains tagging data information, executing a second application, and when a search word for data retrieval is input, retrieving and outputting tagging data including the same tag information as the search word.

17 Claims, 10 Drawing Sheets

METHOD FOR MANAGING DATA AND AN ELECTRONIC DEVICE THEREOF

PRIORITY

The present application claims the benefit under 35 U.S.C. §119(a) of a Korean patent application filed on Jul. 25, 2012 in the Korean Intellectual Property Office and assigned Serial No. 10-2012-0081079, the entire disclosure of which is hereby incorporated by reference.

BACKGROUND OF THE INVENTION

1. Field of the Invention

The present invention relates generally to a data storing and searching method in an electronic device.

2. Description of the Related Art

An electronic device, has become a necessity in modern life due to its portability, and use as a multimedia device which provides various services such as voice and video communication functions, information input/output functions, and data storing.

Such an electronic device is widely used for not only the simple task of making a telephone call or for schedule management but is also used as an image capturing device using an embedded digital camera Further, the electronic device can be used as a satellite positioning device, a document editing device, and a gaming device.

In accordance with the service provided by the electronic device, an amount of data stored in the electronic device also increases. For example, the electronic device generates and stores image data and video data captured by the digital camera, scheduling data generated through a schedule management program, and memo data generated through a document editor.

Mostly, the electronic device allocates a storage space per application to a memory for the data storage and thus the electronic device stores the data generated in the corresponding application. As a result, to check the memo data generated in a memo application, a user needs to execute the memo application and then load the memo data.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide an apparatus and a method for enhancing a data search function in an electronic device.

Another aspect of the present invention is to provide an apparatus and a method for tagging tag information to data to store in an electronic device.

Yet another aspect of the present invention is to provide an apparatus and a method for using contact information as tag information in an electronic device.

In accordance with an aspect of the present invention, a method for retrieving data in an electronic device is provided. The method includes storing tagging data including tag information during execution of a first application, when detecting input of the tag information during execution of a second application, retrieving data corresponding to the tag information in a storage area of the second application, retrieving tagging data corresponding to the tag information among tagging data stored by the first application, and providing data corresponding to the retrieved tag information.

In accordance with another aspect of the present invention, an electronic device for retrieving data is provided. The electronic device includes at least one processor, a memory, and at least one program stored in the memory and configured for execution by the at least one processor. The program includes instructions for storing tagging data including tag information during execution of a first application, when detecting input of the tag information during execution of a second application, retrieving data corresponding to the tag information in a storage area of the second application, retrieving tagging data corresponding to the tag information among tagging data stored by the first application, and providing the retrieved data.

In accordance with another aspect of the present invention, a computer-readable storage medium storing one or more programs for, when executed by the electronic device, performs a method of generating and storing tagging data. The method includes adding tag information when data is stored by executing a first application, updating a tagging data table which contains tagging data information, executing a second application, and retrieving and outputting tagging data including the same tag information as a search word when the search word for retrieving data is input.

In accordance with another aspect of the present invention, a method for retrieving data in an electronic device is provided. The method includes storing tagging data including contact information in a storage area of a third application during execution of a third application execution, when contact information is input during contact application execution, retrieving contact data corresponding to the contact information from the storage area of the contact application, retrieving tagging data including the input contact information among tagging data stored in the storage area of the third application, and providing the retrieved contact and tagging data through the contact application. The third application is an application executing the contact application.

In accordance with aspect of the present invention, a method for retrieving data in an electronic device is provided. The method includes generating data by executing a third application, tagging tag information to the generated data, storing data including the tag information, when detecting an input of contact information during contact application execution, retrieving contact data corresponding to the contact information, retrieving data which uses the contact information as the tag information from a storage area of the data tagged with the tag information, and providing the retrieved data through the contact application. The third application is an application executing the contact application.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and/or other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Typically, a user can install diverse applications in an electronic device, allocate a storage space per application to a memory for data storage, and store data generated in the corresponding application or load the stored data. For example, the electronic device can capture and store an image using a camera function, and generate memo data and/or document data using a memo function.

The electronic device can execute the application of the generated data and then load the stored data using the executed application. However, since a large number of applications can be installed in the electronic device, such a process can cause inconvenience to the user.

The electronic device according to various exemplary embodiments of the present invention can retrieve data using a contact application and thus enhance a data search function.

As data is stored, the electronic device can tag information for identifying the user, to the stored data.

The electronic device can retrieve the stored data using the information for identifying the user.

The electronic device can use one or more of a user's phone number, a user name, a nickname, and an e-mail address as the user identification information.

Hereinafter, exemplary embodiments of the present invention provide an apparatus and a method for easily retrieving tagging data generated in various applications using a contact application by tagging contact information to data to store the data in the electronic device.

The electronic device can be a portable electronic device such as a portable terminal, a mobile phone, a media player, a tablet computer, a handheld computer, or a Personal Digital Assistant (PDA). The electronic device may be a portable electronic device combining two or more functions of the devices described above. Alternatively, the electronic device can include any electronic device including a data storing and/or search function. For example, the electronic device can embrace a desktop computer, a refrigerator, a multi-function peripheral, a video game console, a digital camera, a Mobile Internet Device (MID), an Ultra Mobile Personal Computer (UMPC), a navigation system, a smart TV, a digital clock, and an MP3 player.

Figure 1:
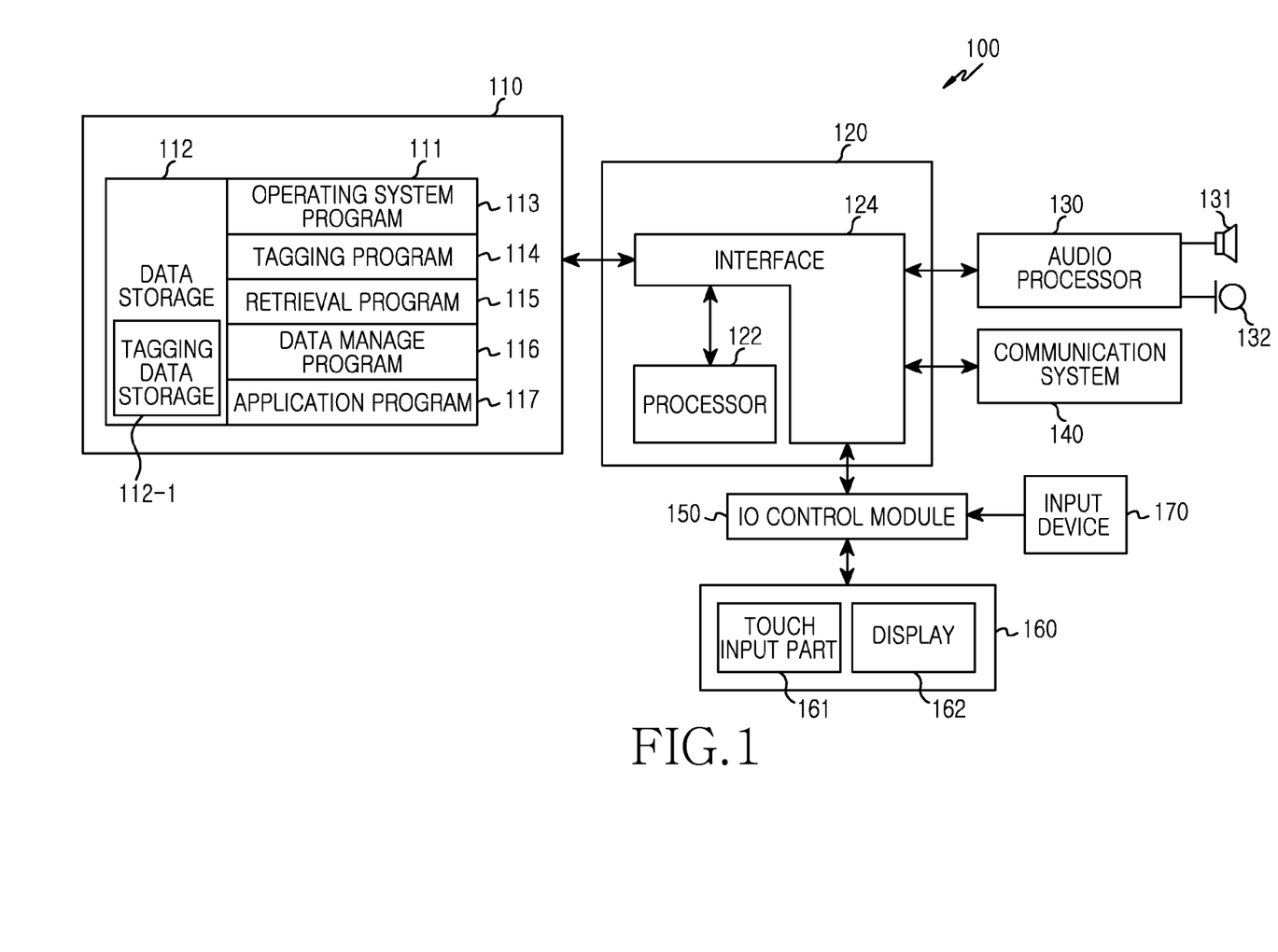
FIG. 1 is a block diagram of an electronic device for managing tagging data according to an exemplary embodiment of the present invention.

FIG. 1 is a block diagram of an electronic device for managing tagging data according to an exemplary embodiment of the present invention.

As shown in FIG. 1, the electronic device 100 can include a memory 110, a processor unit 120, an audio processor 130, a communication system 140, an Input Output (IO) control module 150, a touch screen 160, and an input device 170. Herein, a plurality of one or more of those components can be equipped in the electronic device 100. For example, the electronic device 100 can include a plurality of memories 110 and a plurality of communication systems 140.

Now, the components are explained individually.

The memory 110 can include program storage 111 for storing one or more programs to control operations of the electronic device 100 and data storage 112 for storing data generated in program execution. For example, the data storage 112 can store updatable data such as a phonebook, an outgoing message, and an incoming message. In addition, the data storage 112 can include a tagging data storage 112-1 for storing tagging data including tag information or a tagging data table which defines the tagging data. Herein, the tagging data storage 112-1 is a storage space allowing the communication between the applications, and can be a separate space for storing only information about the tagging data.

The program storage 111 can include an operating system program 113, a tagging program 114, a retrieval program 115, a data manage program 116, and at least one application program 117. Herein, the program in the program storage 111 may be referred to as an instruction set which is a set of instructions. The programs in the program storage 111 can be presented using a hardware structure. For example, the electronic device 100 can include an operating system module, a tagging module, and a retrieval module.

The operating system program 113 can include various software components for controlling general system operations. These system operations include, e.g., memory management and control, storage hardware (device) control and management, and power control and management. The operating system program 113 processes normal communication between various hardware (devices) and software components (modules).

The tagging program 114 can include at least one software component for tagging the tag information on the data to be stored. That is, the tagging program 114 can process to tag user information on the data to be stored according to a user's request. In so doing, the tagging program 114 can tag the user information to at least one of a body, a file name, and attribute information of the stored data.

After tagging the tag information on the data, the tagging program 114 can perform a process to manage the tagging data table. That is, the tagging program 114 can update and store information about the tagging data newly added or deleted, in the tagging data table.

In addition, the tagging program 114 can perform a process to tag program information on the data to be stored and change the storage space of the tagging data according to the tagged information. For example, the tagging program 114 can perform a process to store the data (e.g., meeting schedule) generated in the memo application in the storage space of a schedule application and perform a process to register the corresponding data to a scheduler.

The retrieval program 115 can include at least one software component for retrieving and outputting the tagging data corresponding to the tag information among the pre-stored data.

That is, upon confirming the tag information in the loaded data, the retrieval program 115 can perform a process to retrieve the tagging data corresponding to the tag information.

When confirming the tag information input from the user, the retrieval program 115 can perform a process to retrieve the tagging data corresponding to the tag information.

Further, when detecting a tagging data execution request, the retrieval program 115 can perform a process to run the application corresponding to the tagging data and to load the tagging data in response to the execution request.

In doing so, the retrieval program 115 can retrieve the tagging data from the tagging data table managed by the tagging program 114, and obtain information of the application to execute.

The data manage program 116 can include software to manage the programs.

The application program 117 can includes a software component for at least one application program installed in the electronic device 100.

The processor unit 120 can include at least one processor 122 and an interface 124. Herein, the processor 122 and the interface 124 can be integrated onto at least one integrated circuit or embodied separately.

The interface 124 can function as a memory interface for controlling access to the processor 122 and the memory 110.

In addition, the interface 124 can function as a peripheral interface for controlling connections between an IO peripheral of the electronic device 100, and the processor 122.

The processor 122 can control the electronic device 100 to manage the tagging data using at least one software program. In so doing, the processor 122 can control a process to execute at least one program stored in the memory 110 and to provide a tagging data management function corresponding to the program. For example, the processor 122 can include a tagging processor for running the tagging program 114 and the retrieval program 115. That is, the data storage and search function of the electronic device 100 can be fulfilled using the software such as the program stored in the memory 110 or the hardware such as a tagging processor.

The audio processor 130 provides an audio interface between the user and the electronic device 100 through a speaker 131 and a microphone 132.

The communication system 140 can process voice communication and data communication of the electronic device 100. The communication system 140 may be divided into a plurality of communication submodules for supporting different communication networks. For example, the communication networks can include, but are not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, and Near Field Communication (NFC).

The IO controller module 150 can provide an interface between an IO device, such as a touch screen 160 and an input device 170, and the interface 124.

The touch screen 160, which is an IO device for outputting and inputting information, includes a touch input part 161 and a display 162.

The touch input part 161 can provide touch information detected through a touch panel, to the processor unit 120 via the IO controller module 150. In so doing, the touch input part 161 can change the touch information to an instruction such as touch_down, touch_move, and touch_up and provide the instruction to the processor unit 120.

The display 162 can display status information of the electronic device 100, a character input by the user, a moving picture, and a still picture. For example, the display 162 can display a data tagging process and a tagging data search process.

The input device 170 can provide input data generated by the user's selection to the processor unit 120 through the IO controller module 150. For example, the input device 170 can include only a control button to control the electronic device 100. For example, the input device 170 may include a keypad for receiving the input data from the user. That is, the input device 170 can generate the input data of the tag information to generate the tagging data.

The electronic device 100 can further include components (not shown) or provide additional functions, such as a camera module for capturing the image or the video, a broadcasting receiver module for receiving the broadcasting, a digital music player module such as an MP3 module, a close-range wireless communication module for close-range wireless communication, and a proximity sensor module for sensing proximity, and their software.

The electronic device 100 according to various exemplary embodiments of the present invention includes at least one processor, a memory, and at least one program stored in the memory and configured for execution by the at least one processor. The program can include instructions for storing the tagging data including the tag information during a first application execution, retrieving the data corresponding to the tag information in the storage area of a second application when the input of the tag information is detected during a second application execution, retrieving the tagging data corresponding to the tag information from the tagging data stored by the first application, and providing the retrieved data.

The program can include an instruction for, after storing the tagging data, processing to update the tagging data table.

The program can include an instruction for, when detecting the tag information in the loaded data during the second application execution, providing the tagging data corresponding to the tag information.

The program can include an instruction for, after providing the tagging data and executing the first application which generates the selected tagging data, processing to load the tagging data.

The program can add at least one of the user's phone number, the user's name, the nickname, and the e-mail address, as the user identification information, to the data.

The program can update the contact data table using at least one of the tag information, application information, body type, body, and title.

The program can include an instruction for processing a change to the tagging data storage space using the tag information added in the data storage.

The program can use the application information corresponding to the storage space to change, as the tag information added to the data.

The second application can be contact information for managing contact data per user, and the first application can be an application excluding the second application.

Figure 2:
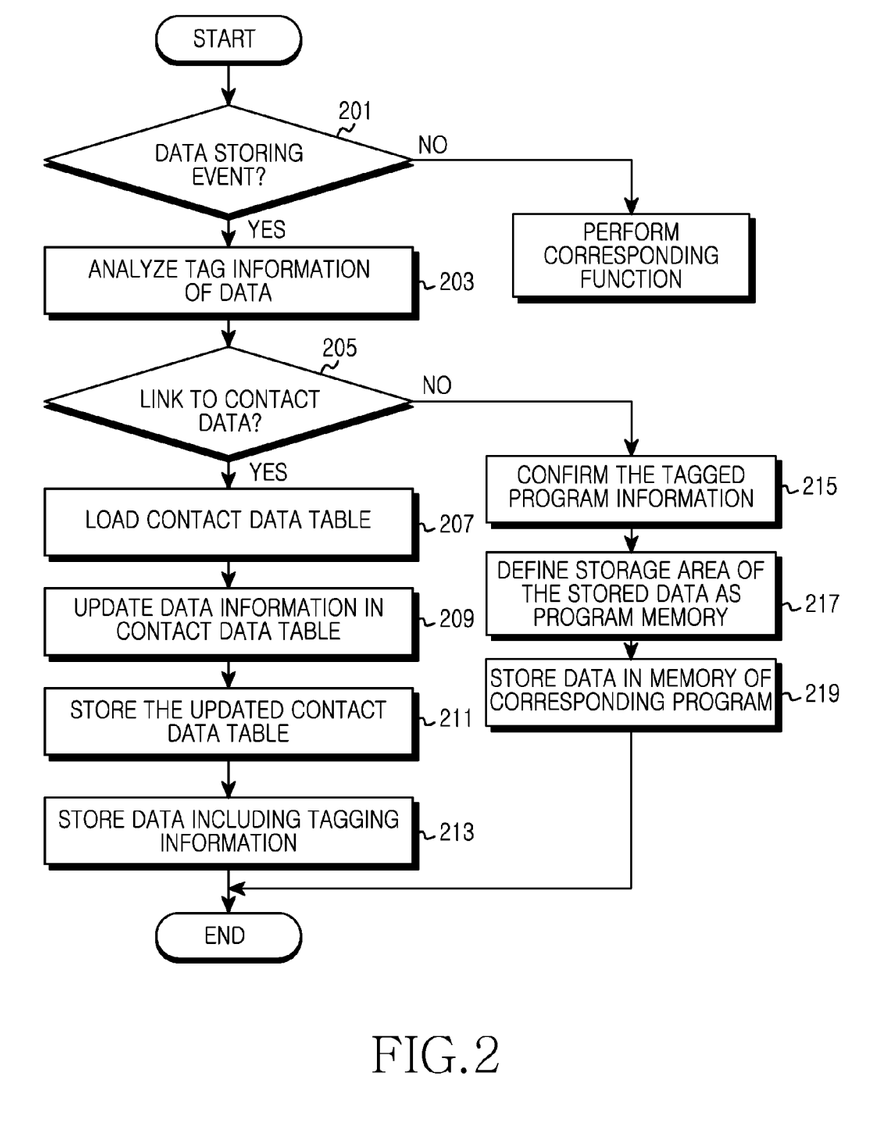
FIG. 2 is a flowchart of a data storing method of an electronic device according to an exemplary embodiment of the present invention.

FIG. 2 is a flowchart of a data storing method of an electronic device according to an exemplary embodiment of the present invention.

Referring to FIG. 2, the data storing method can tag user information on the data to be stored. Herein, the user information tagged on the data can use information, such as a user's phone number, a user's name, nickname, and e-mail address, for fetching the contact data registered to the contact application.

Mostly, the electronic device 100 stores the data generated in the corresponding application by dividing the data storage space for the applications. That is, the electronic device 100 classifies the stored data per application. In this case, the user needs to load the intended data by executing the corresponding application.

To address this problem, the electronic device 100 can distinguish the data based on the user by tagging the user information onto the data.

In addition, the data storing method can tag the program information of the storage space to change the storage space of the data to be stored. Herein, the program information tagged onto the data can use application information in association with the data.

By doing so, the electronic device 100 can determine whether a data storing event occurs in step 201. Herein, the data storing event can generate new data by running an application, input and store tagging information or edit the pre-stored data (e.g., change the data body or the file name), and then input and store the tagging information.

When the data storing event does not occur in step 201, the electronic device 100 can perform the corresponding function. For example, the electronic device 100 can generate or edit the data by executing the application.

By contrast, when the data storing event occurs in step 201, the electronic device 100 can analyze the tagging information in the data to be stored in step 203 and check the data storing type in step 205.

Herein, the data storing type can include a storing type which tags the user information onto the data to be stored and links to the contact information, and a storing type which changes the storage space by tagging the program information on the data to be stored.

Therefore, the electronic device can identify the data storing type by checking the tagging information in the data to be stored by the user. The tagging information can be defined as a particular character. For example, the tagging information for linking the contact data can be defined as the character "@", and the tagging information for changing the storage space can be defined as the character "#". That is, with the character @ indicating the start of the tagging information and the character @ indicating the end of the tagging information, the electronic device 100 confirms that information between the two characters @ is the tagging information.

That is, when the user information is tagged on at least one of the body, the file name, and the attribute information of the stored data, the electronic device 100 can determine the link to the contact data.

By contrast, when the program information is tagged on at least one of the body, the file name, and the attribute information of the stored data, the electronic device 100 can determine the link with the program.

Upon confirming the link to the contact data in step 205, the electronic device 100 can load the contact data table in step 207 and update the data information in the loaded contact data table in step 209. Herein, the contact data table is table information defining the user information tagged data, and can arrange the tagging information, the application information, the body type, the body, and the title as shown in Table 1.

TABLE 1

| Tag | app | body type | Body | title |
|---|---|---|---|---|
| andrew | memo | txt | meeting | this week schedule |
| andrew | gallery | img | /home/img/a.jpg | favorite photo |
| user | browser | hyperlink | http://samsung.com | bookmark |

Herein, the tagging information is used to determine the data storing type, and can include the user information for classifying the data to store based on the user and the program information for changing the storage space. The application information relates to the application which generates the data to be stored. When the user selects the stored data with the tagging information, the electronic device 100 can perform a process to load the data selected by the user by executing the corresponding application. The body type indicates a type of the data stored as the tagging information and can include, for example, text, image, audio, video, hyperlink, and so on. The body can indicate the data body stored as the tagging information. The title can indicate a title of the data stored as the tagging information.

In Table 1, the electronic device 100 stores the contact data table which contains three data tagged with the user information.

That is, the contact data table stored in the electronic device stores, as the prestored data information, the memo and the image stored as the tagging information corresponding to "andrew", and the bookmark data stored as the tagging information "user".

The memo data stored as the tagging information "andrew" is generated in the memo application and has the title "this week schedule", and the image data has the title "favorite photo". The data body of the image data can be replaced by a data storage path.

The bookmark data stored as the tagging information "user" is generated in a browser being executed.

As such, the contact data table can be updated every time the data including the tagging information is stored.

After updating the contact data table, the electronic device 100 can store the updated contact data table in step 211 and store the data including the tagging information in step 213.

In doing so, the electronic device 100 can store the data including the tagging information and the contact data table in a separate memory space such as the tagging data storage.

Alternatively, the electronic device 100 can store the data including the tagging information in the storage space corresponding to the application, and store only the contact data table in the tagging data storage.

Herein, the tagging data storage is the storage space allowing the communication between the applications, and can use a separate space for storing only the tagging data information.

Upon confirming the link to the program in step 205, the electronic device can obtain the program information tagged onto the data to be stored in step 215 and define the storage space of the stored data as a program memory in step 217. Herein, the program memory can be the storage space allocated per application.

In step 219, the electronic device 100 can store the data in a memory of the corresponding program. Herein, in step 219, the electronic device stores the data generated in the current application in the storage space of other application. For example, the electronic device can transfer the schedule related memo generated in the memo application to the storage space of the schedule application.

Figure 3:
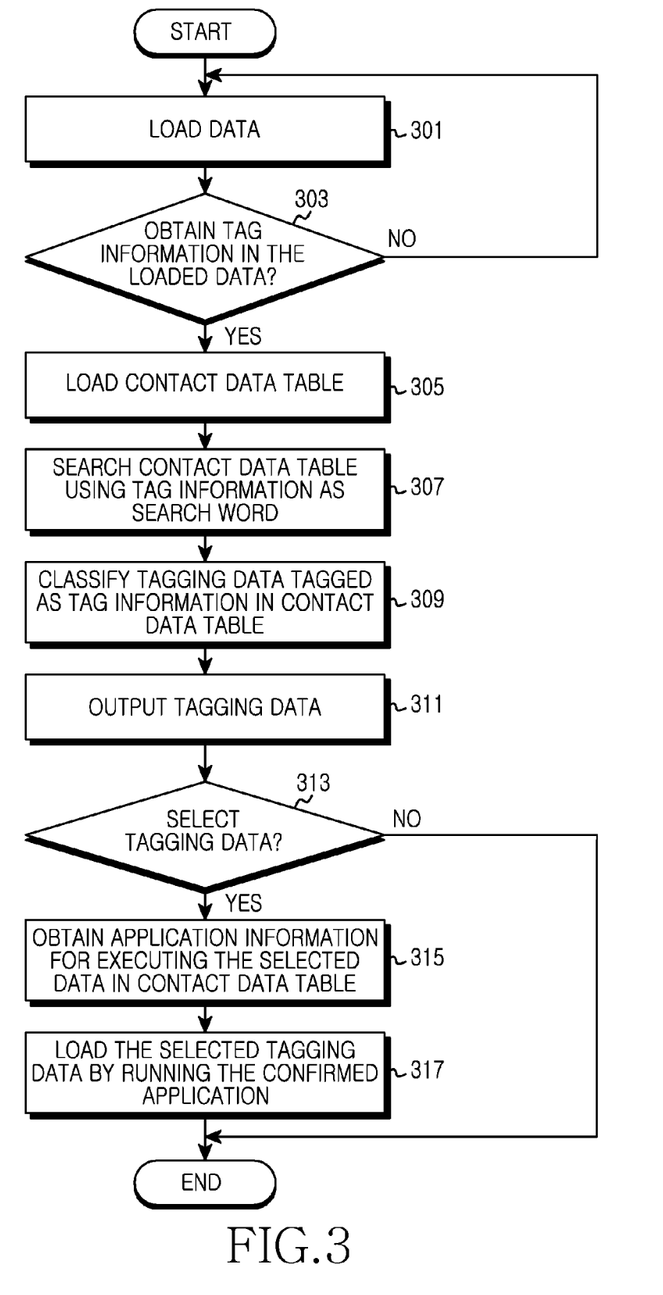
FIG. 3 is a flowchart of a data retrieval method of an electronic device according to an exemplary embodiment of the present invention.

FIG. 3 is a flowchart of a data retrieval method of an electronic device according to an exemplary embodiment of the present invention.

Referring to FIG. 3, the electronic device 100 can load data in step 301 and confirm tag information in the loaded data in step 303. For example, in the memo data, the electronic device 100 can determine whether the memo contents include the tag information. In general, the user can define the memo content range to copy or to cut. In so doing, the electronic device 100 can determine whether this range includes the tag information.

When the tag information in the loaded data is not confirmed as in step 303, the electronic device 100 returns to loading the data as in step 301.

By contrast, upon confirming the tag information in the loaded data in step 303, the electronic device 100 can load the contact data table in step 305 and search the contact data table using the tag information as a search word in step 307.

The electronic device 100 can retrieve and classify the tagging data corresponding to the tag information among the pre-stored data in step 309, and output a list of the tagging data in step 311.

That is, as the memory application, the browser, and the image application are running, the electronic device 100 can retrieve and output the tagging data including particular tag information. Herein, the output tagging data can be the data generated in a different application but include the same tag information.

In step 313, the electronic device 100 can determine whether the user selects the data in the list of the output tagging data.

When the user selects no data in step 313, the electronic device 100 can finish this process.

By contrast, when the user selects the data in step 313, the electronic device 100 can obtain the application information for executing the selected data in the contact data table in step 315, and perform a process to load the data selected by the user by running the application identified in step 315, in step 317.

Figure 4:
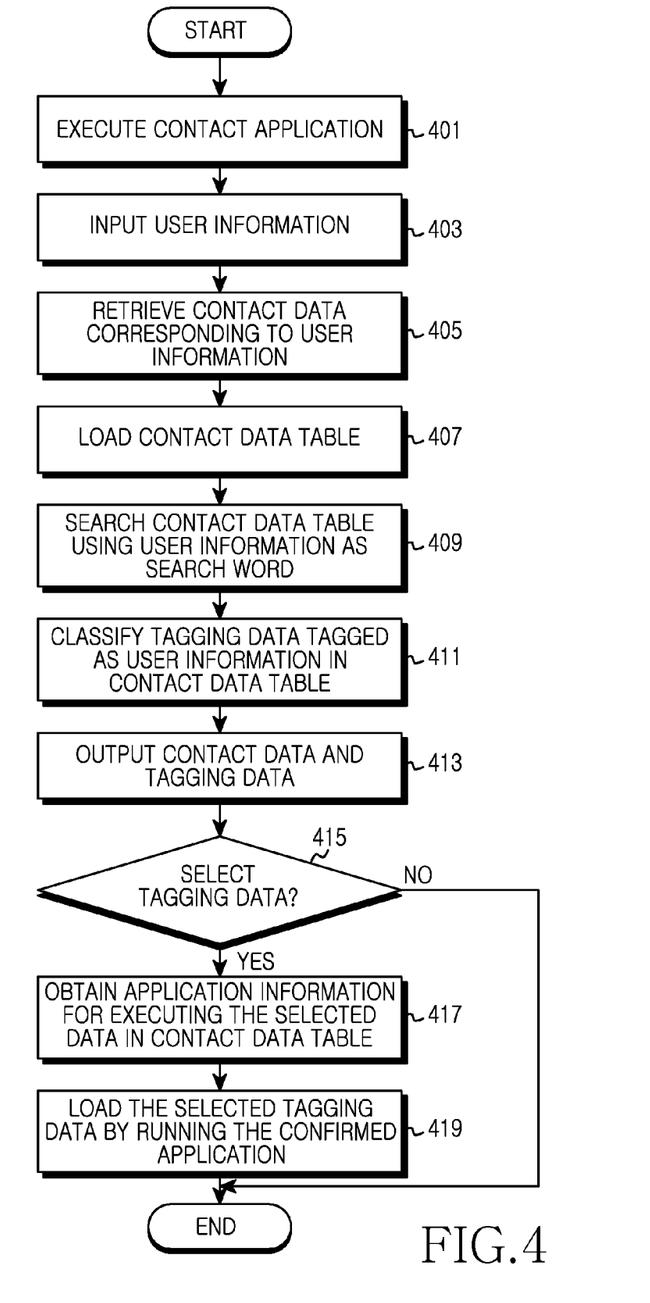
FIG. 4 is a flowchart of a data retrieval method of an electronic device according to another exemplary embodiment of the present invention.

FIG. 4 is a flowchart of the data retrieval method of an electronic device according to an exemplary embodiment of the present invention.

Referring to FIG. 4, the user can execute a contact application for managing the phone numbers and the e-mail addresses in step 401, and receive user information for retrieving the contact data from the user in step 403.

Herein, the user information can include the phone number, the user name, the nickname, and the e-mail address.

The electronic device 100 can retrieve the contact data corresponding to the input user information in step 405, and load the contact data table in step 407.

The electronic device 100 can search the contact data table using the user information as the search word in step 409, and classify the tagging data corresponding to the tag information among the pre-stored data in step 411.

The electronic device 100 can output the contact data retrieved with the user information and the tagging data list in step 413, and determine whether the user selects the data in the output tagging data list in step 415.

When the user selects no tagging data in step 415, the electronic device 100 can finish this process.

By contrast, when the user selects the tagging data in step 415, the electronic device 100 can confirm the application information for executing the selected data in the contact data table in step 417.

In step 419, the electronic device 100 can load the data selected by the user by running the application confirmed in step 417.

Figure 5:
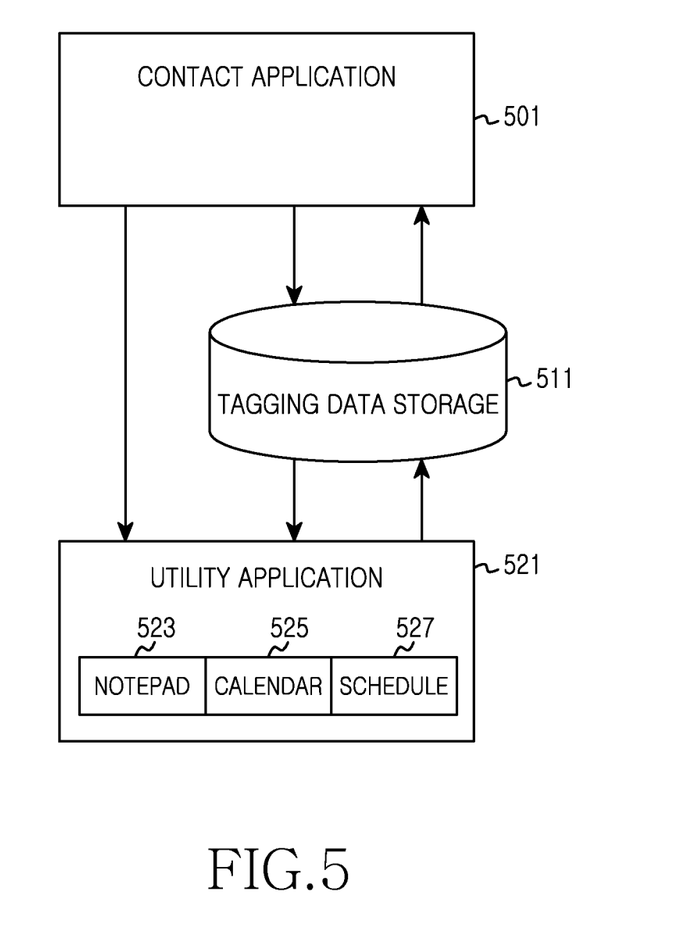
FIG. 5 is a diagram of tagging data retrieved from an electronic device according to an exemplary embodiment of the present invention.

FIG. 5 depicts tagging data retrieved from an electronic device according to an exemplary embodiment of the present invention.

Referring to FIG. 5, the electronic device 100 can include tagging data storage 511 for accessing applications. That is, utility applications 521 including a notepad 523, a calendar 525, and a scheduler 527 can store data including tagging data in the utility application 521. Alternatively, the utility applications 521 can store the tagging data table which contains the data information including the tagging information, in the tagging data storage 511.

Typically, the memo data generated in the notepad 523 can be stored in the storage space allocated to the notepad 523. However, the memo data can also be stored in the tagging data storage 511 in an exemplary embodiment of the present invention.

Accordingly, when the user inputs the user information in the contact application 501, the electronic device 100 can obtain the tagging data corresponding to the user information from the tagging data storage 511.

That is, the electronic device 100 can retrieve the data generated in the utility application 521 through the contact application 501. Notably, the retrieved data can be data including the same tag information as the input data of the contact application 501.

Figures 6A, 6B:
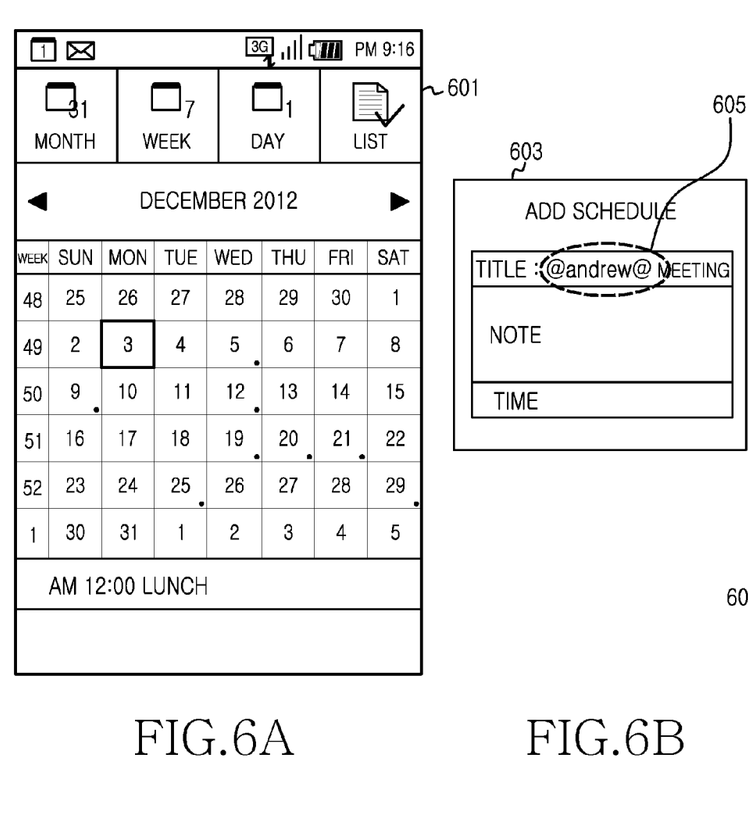
FIGS. 6A to 6C are diagrams of tagging data stored in an electronic device according to an exemplary embodiment of the present invention.
Figure 6C:
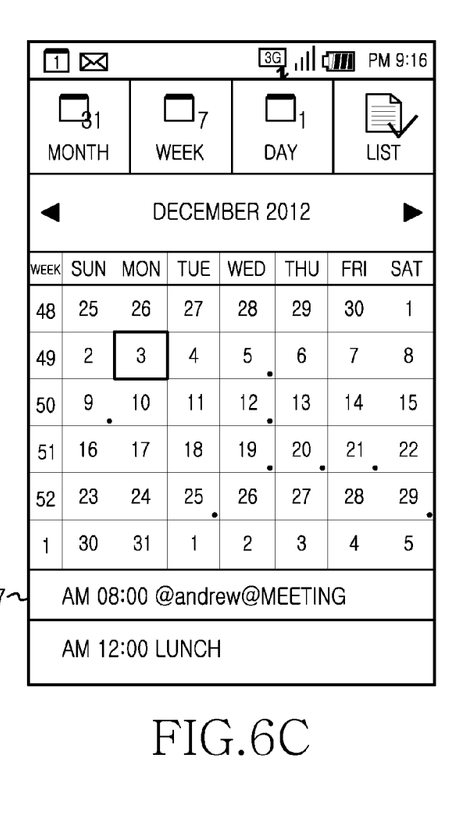

FIGS. 6A to 6C depict tagging data stored in an electronic device according to an exemplary embodiment of the present invention.

Referring to FIG. 6, the electronic device 100 can store data generated using the scheduler 527, as tagging data.

The electronic device 100 can execute a scheduler application 601 as shown in FIG. 6A. When the user selects a schedule to register the new schedule, the electronic device 100 can output a schedule registration screen 603 as shown in FIG. 6B.

Generally, the user can input the schedule information in the output schedule registration screen 603.

For example, as illustrated in FIG. 6B, the user can add the tag information 605 on the schedule registration screen 603 on the schedule title or note and store the tag information as the tagging data.

Herein, the tagging data can be retrieved as the tag information even in other applications of the electronic device 100.

That is, when "andrew" is tagged to the new schedule information to register, the user can confirm the schedule information using the tag information "andrew" in the contact application. The character @ before and after the tag information 605 can distinguish the tag information 605.

The electronic device 100 receiving the tag information 605 can register the new schedule 607 to the scheduler as shown in FIG. 6C.

Figure 7A:
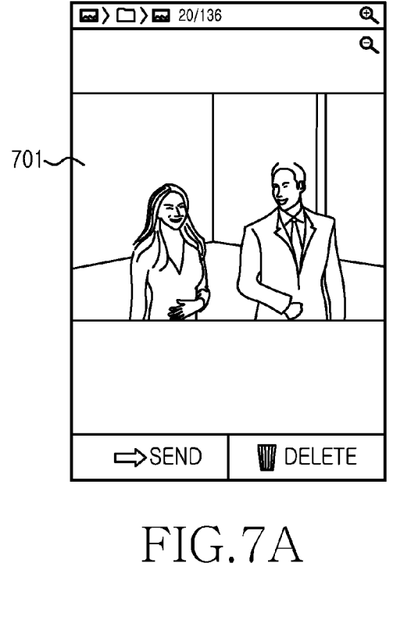
FIGS. 7A to 7C are diagrams of tagging data stored in an electronic device according to another exemplary embodiment of the present invention.
Figure 7B:
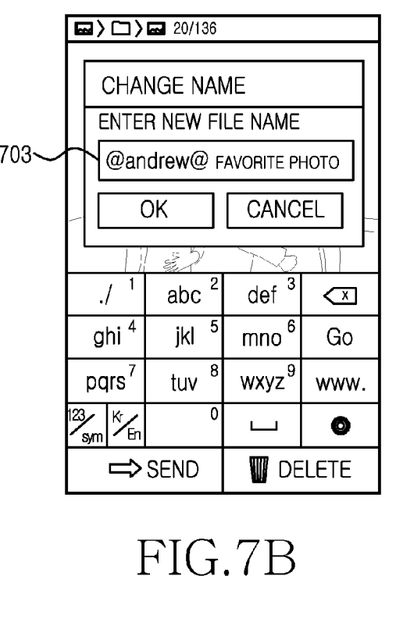
Figure 7C:
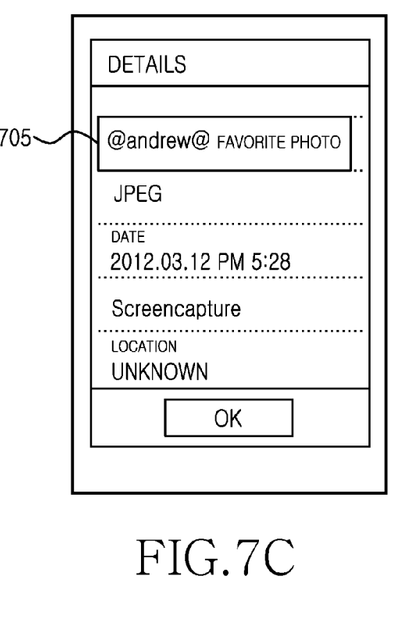

FIGS. 7A to 7C depict tagging data stored in an electronic device according to an exemplary embodiment of the present invention.

Referring to FIG. 7, the electronic device 100 can store data generated in an image viewer, as the tagging data.

First, the electronic device 100 can execute an image viewer application 701 as shown in FIG. 7A. When the user requests to edit the data (e.g., change the file name) output through the image viewer, the electronic device 100 can output a data editing screen as shown in FIG. 7B.

In general, the user can edit the data by inputting and registering information in the output schedule registration screen.

Accordingly, the user can add the tag information @andrew@ 703 in addition to the information to be changed and store the information as tagging data. That is, the tag information 705 is added to detail information of the tagging data as shown in FIG. 7C.

Herein, the tagging data can be retrieved as tag information even in other applications of the electronic device.

That is, when "andrew" is tagged to the information to be changed, the user can confirm the image data including the added tag information using the tag information "andrew" in the contact application.

Figure 8A:
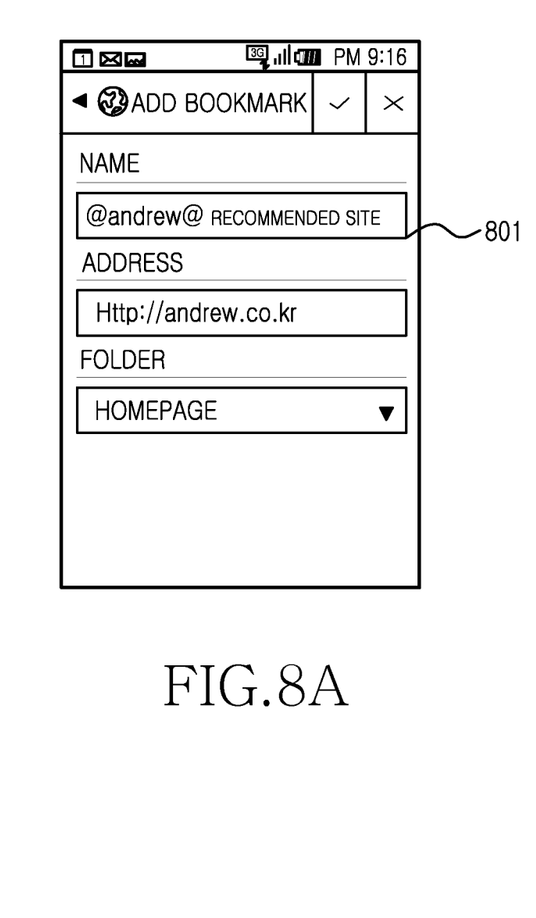
FIGS. 8A to 8B are diagrams of tagging data stored in an electronic device according to yet another exemplary embodiment of the present invention.
Figure 8B:
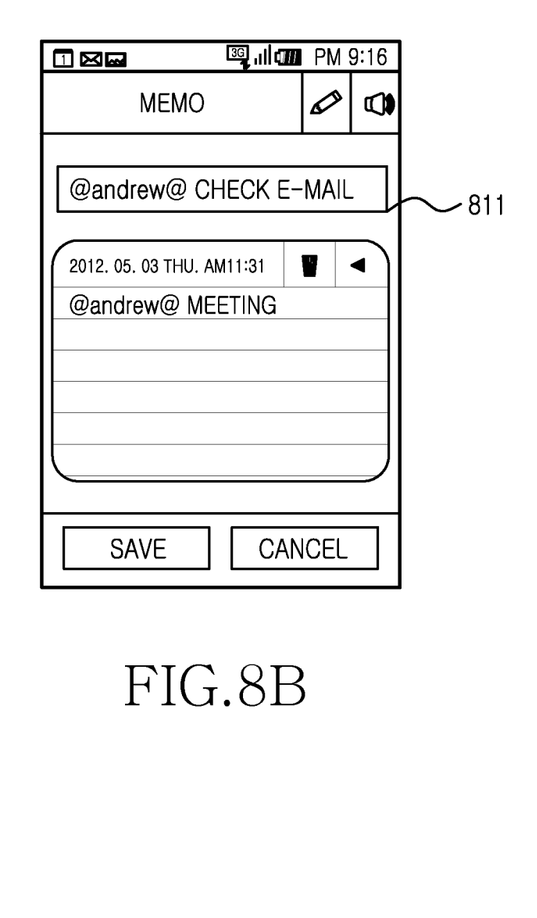

FIGS. 8A and 8B depict the tagging data stored in an electronic device according to another exemplary embodiment of the present invention.

Referring to FIG. 8, the electronic device 100 can store data generated in the browser, as the tagging data as shown in FIG. 8A.

After accessing the browser, when the user requests the web registration, the electronic device 100 can output a screen for the bookmarks.

Typically, the user can input a web address to bookmark and web address information (bookmark name and folder) in the bookmark screen.

Accordingly, the user can add the tag information @andrew@ 801 in addition to the input information and store the information as the tagging data.

Accordingly, the tagging data can be retrieved as the tag information even in other applications of the electronic device 100.

That is, when "andrew" is tagged to the information of the bookmark, the user can confirm the bookmark information including the added tag information using the tag information "andrew" in the contact application.

Further, the electronic device 100 can store the data generated in the memo application, as the tagging data as shown in FIG. 8B.

First, the electronic device 100 can execute the memo application and then receive data from the user.

Mostly, the user can input data to a document using the memo application.

Accordingly, the user can add the tag information @andrew@ 811 in addition to the input information and store the information as the tagging data.

Herein, the tagging data can be retrieved as the tag information even in other applications of the electronic device 100.

That is, when "andrew" is tagged to the information to register, the user can confirm the memo information including the added tag information using the tag information "andrew" in the contact application.

Figure 9A:
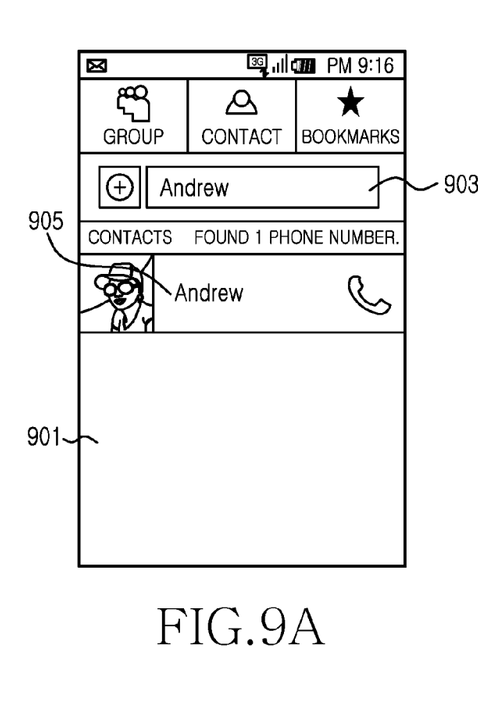
FIGS. 9A to 9C are diagrams of tagging data retrieval in an electronic device according to an exemplary embodiment of the present invention.
Figure 9B:
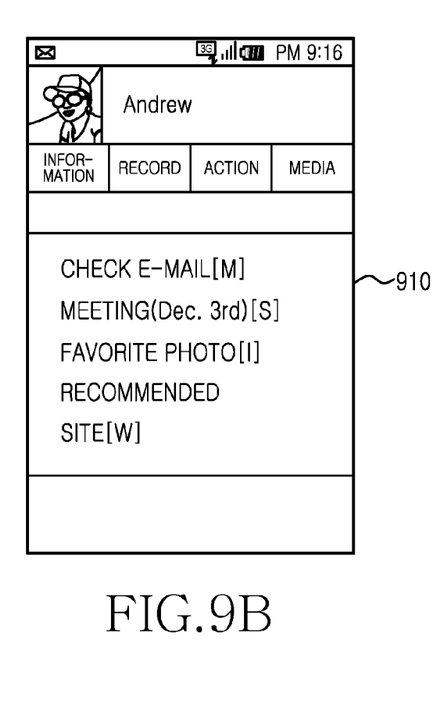
Figure 9C:
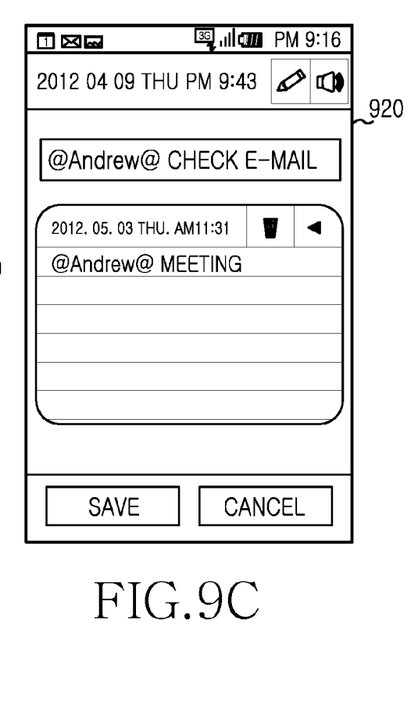

FIGS. 9A to 9C depict tagging data retrieval in an electronic device according to an exemplary embodiment of the present invention.

Referring to FIG. 9, the electronic device 100 can retrieve tagging data using the contact application.

Typically, the contact application is an application for managing user contact data, and can support a word search such as user's phone number, user name, nickname, and e-mail address.

That is, while the contact application 901 is executed, the user can input the user name and thus retrieve the phone number, the nickname, and the e-mail address corresponding to the input user name.

For example, when the contact application is executed and the user inputs the search word "Andrew" 903, the electronic device 100 can retrieve the contact data 905 corresponding to the searched word as shown in FIG. 9A. When the user selects the retrieved contact data, the electronic device 100 can attempt a call connection to the user corresponding to the selected contact data.

In this manner, the present electronic device 100 can retrieve the contact data. At the same time, the electronic device 100 can retrieve the tagged data with the search word and provide search results 910 as shown in FIG. 9B.

The tagging data tagged with "Andrew" includes memo data including "Check e-mail", schedule data "meeting (December 3)", image data "favorite photo", and web bookmark "recommended website".

The search results include the characters indicating the tagging data body and the tagging data type. For example, in "Check e-mail [M]", "Check e-mail" is the data body and "M" denotes the memo data. Likewise, "S" can denote the schedule data, "I" can denote the image data, and "W" can denote the web bookmark.

When the user selects the output tagging data, the electronic device 100 can perform a process to load the tagging data as shown in FIG. 9C. In doing so, the electronic device 100 loads the selected data by running the application supporting the tagging data. In FIG. 9C, the electronic device executes the memo application and loads the memo data 920 including the tagging data.

Figure 10A:
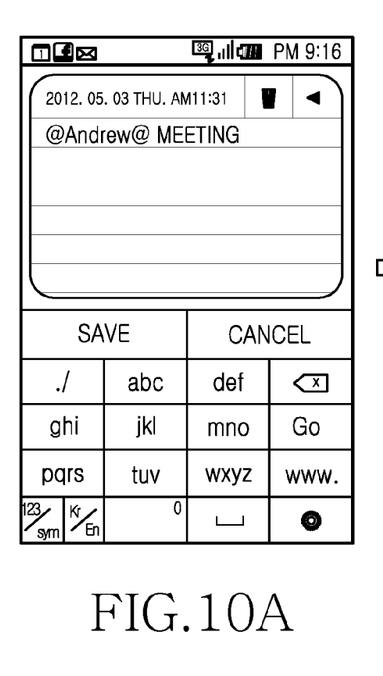
FIGS. 10A to 10C are diagrams of tagging data retrieval in an electronic device according to an exemplary embodiment of the present invention.
Figure 10B:
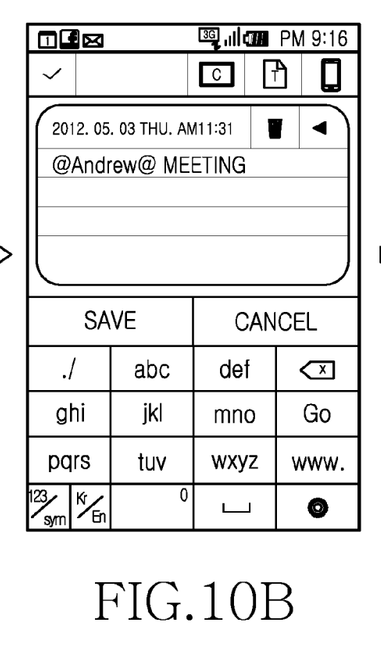
Figure 10C:
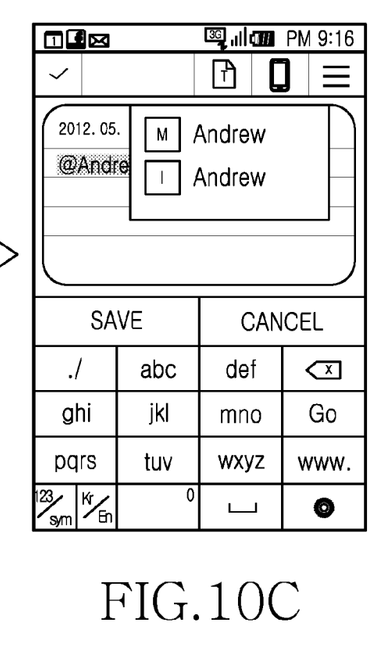

FIGS. 10A to 10C depict a tagging data retrieval in an electronic device according to another exemplary embodiment of the present invention.

Referring to FIG. 10, the electronic device 100 can retrieve the tagging data using not only the contact application but also the memo application.

Typically, the memo application can receive the data body to be stored from the user and can store the data body as a file as shown in FIG. 10A. The memo application can load the stored file according to the user's request and output the input data.

In addition, the memo application can drag the data (the shaded region shown in FIG. 10C) input by the user as shown in FIG. 10B. This is the dragged data is copied to another function which allows character input.

Upon confirming that the dragged region includes the tag information, the electronic device 100 can retrieve the data tagged with the tag information using the tag information as the search word and provide search results as shown in FIG. 10C.

As the tag information is dragged, the stored memo data and image data corresponding to the tag information is output.

According to various exemplary embodiments of the present invention, the electronic device can fulfill the following operations.

The data retrieval method of the electronic device can include storing tagging data including tag information during execution of a first application, when detecting input of the tag information during execution of a second application, retrieving data corresponding to the tag information from a storage area of the second application, retrieving tagging data corresponding to the tag information among tagging data stored by the first application, and providing data corresponding to the retrieved tag information.

The storing of the tagging data can include updating a tagging data table.

The data retrieval method of the electronic device can include providing tagging data corresponding to tag information in the loaded data during execution of the second application.

The data retrieval method of the electronic device can include, after providing the tagging data, loading tagging data selected by the user. The selected tagging data can be loaded by executing the first application which generates the tagging data.

The tag information added to the data can be information for identifying the user, and include at least one of a user phone number, a user name, a nickname, and an e-mail address.

The contact data table can include at least one of tagging information, application information, body type, body, and title.

The data retrieval method of the electronic device can include changing a storage space of the tagging data using the tag information added when the data is stored.

The tag information added when the data is stored can be application information corresponding to the storage space to change.

The second application can be a contact application for managing contact data, and the first application can be an application excluding the second application.

As set forth above, to enhance the data retrieval function in the electronic device, the contact data and the tagging data can be all confirmed together in the contact application by use of the contact information tagged to the stored data.

It will be appreciated that exemplary embodiments of the present invention according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present invention. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing processes on an apparatus or a method as claimed in any one of the claims of this specification and a machine-readable storage storing such a program. Still further, such programs may be conveyed electronically via any medium such as a communication signal carried over a wired or wireless connection and exemplary embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method in an electronic device, the method comprising:
   storing tagging data comprising tag information during execution of a first application;
   in response to detecting input of the tag information during execution of a second application, searching tagging data corresponding to the tag information using the tag information as a search word among tagged data stored by the first application;
   displaying a list of searched tagging data;
   detecting a selection of tagging data from the list;
   executing the first application based on tag information of the selected tagging data during execution of the second application; and
   loading and displaying the selected tagging data by the first application.

2. The method of claim 1, wherein the storing of the tagging data comprises:
   updating a tagging data table.

3. The method of claim 1, further comprising:
   providing tagging data corresponding to tag information in data loaded during the execution of the second application.

4. The method of claim 1, wherein the tag information is added to the data and comprises information for identifying the user and the information for identifying the user comprises at least one of a user phone number, a user name, a nickname, and an e-mail address.

5. The method of claim 1, wherein the tagging data table comprises at least one of tagging information, application information, body type, body, and title.

6. The method of claim 1, further comprising:
changing a storage space of the tagging data using the tag information which is added to the tagging data when the data is stored.

7. The method of claim 6, wherein the tag information which is added to the tagging data when the data is stored is application information corresponding to the storage space to be changed.

8. The method of claim 1, wherein the second application is a contact application for managing contact data per user, and the first application is an application excluding the second application.

9. An electronic device comprising:
at least one processor;
a display;
a memory; and
at least one program stored in the memory and configured for execution by the at least one processor,
wherein the program comprises instructions for storing tagging data comprising tag information during execution of a first application, in response to detecting input of the tag information during execution of a second application, searching tagging data corresponding to the tag information using the tag information as a search word among tagged data stored by the first application, controlling the display to display a list of searched tagging data, detecting a selection of tagging data from the list, executing the first application based on tag information of the selected tagging data during execution of the second application, and loading and displaying the selected tagging data by executing the first application.

10. The electronic device of claim 9, wherein the program comprises an instruction for, after storing the tagging data, updating a tagging data table.

11. The electronic device of claim 9, wherein the program comprises an instruction for, when detecting tag information in the loaded data, providing tagging data corresponding to the tag information.

12. The electronic device of claim 9, wherein the program adds at least one of a user phone number, a user name, a nickname, and an e-mail address, as user identification information, to the data.

13. The electronic device of claim 9, wherein the program updates the tagging data table using at least one of tagging information, application information, body type, body, and title.

14. The electronic device of claim 9, wherein the program comprises an instruction for processing a change of a storage space of the tagging data using the tag information added when the data is stored.

15. The electronic device of claim 14, wherein the program uses application information corresponding to the storage space to be changed, as the tag information which is added to the data.

16. The electronic device of claim 9, wherein the second application is a contact application for managing contact data, and the first application is an application excluding the second application.

17. A non-transitory computer-readable storage medium storing one or more programs which comprise instructions which, when executed by an electronic device, make the electronic device execute the method as described in claim 1.

* * * * *